(12) United States Patent
Viseh

(10) Patent No.: US 10,762,713 B2
(45) Date of Patent: Sep. 1, 2020

(54) METHOD FOR DEVELOPING AUGMENTED REALITY EXPERIENCES IN LOW COMPUTER POWER SYSTEMS AND DEVICES

(71) Applicant: SHOPPAR INC., San Francisco, CA (US)

(72) Inventor: Sina Viseh, San Francisco, CA (US)

(73) Assignee: SHOPPAR INC., San Francisco, CA (US)

( * ) Notice: Subject to any disclaimer, the term of this patent is extended or adjusted under 35 U.S.C. 154(b) by 50 days.

(21) Appl. No.: 16/134,943

(22) Filed: Sep. 18, 2018

(65) Prior Publication Data

US 2019/0088027 A1 Mar. 21, 2019

Related U.S. Application Data

(60) Provisional application No. 62/559,697, filed on Sep. 18, 2017.

(51) Int. Cl.

| | |
|---|---|
| *G06T 19/00* | (2011.01) |
| *G06T 7/73* | (2017.01) |
| *G06K 9/40* | (2006.01) |
| *G06T 3/00* | (2006.01) |
| *G06T 1/60* | (2006.01) |
| *G06T 7/277* | (2017.01) |
| *G06K 9/00* | (2006.01) |

(52) U.S. Cl.
CPC ........ *G06T 19/006* (2013.01); *G06K 9/00671* (2013.01); *G06K 9/40* (2013.01); *G06T 1/60* (2013.01); *G06T 3/0006* (2013.01); *G06T 7/277* (2017.01); *G06T 7/74* (2017.01); *G06T 2207/10016* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 9,842,399 B2 * | 12/2017 | Yamaguchi | ............... G06T 7/97 |
| 2011/0148924 A1 * | 6/2011 | Tapley | ................. G06F 3/0325 |
| | | | 345/634 |
| 2012/0062702 A1 * | 3/2012 | Jiang | ........................ G06T 7/74 |
| | | | 348/46 |

(Continued)

*Primary Examiner* — Jason A Pringle-Parker
(74) *Attorney, Agent, or Firm* — Im IP Law; Chai Im; C. Andrew Im

(57) ABSTRACT

A method and system for generating an augmented reality experience without a physical marker. At least two frames from a video stream are collected and one of the frames is designated as a first frame. The graphical processor of a device prepares two collected frames for analysis and features from the two collected frames are selected for comparison. The central processor of the device isolates points on a same plane as a tracked point in the first frame and calculates a position of a virtual object in a second frame in 2D. The next frame from the video stream is collected and the process is repeated until the user navigates away from the URL, webpage or when the camera is turned off. The central processor renders the virtual object on a display of the device.

20 Claims, 18 Drawing Sheets
(7 of 18 Drawing Sheet(s) Filed in Color)

(56) References Cited

U.S. PATENT DOCUMENTS

| | | | | |
|---|---|---|---|---|
| 2012/0300979 | A1* | 11/2012 | Pirchheim | G06T 7/246 |
| | | | | 382/103 |
| 2013/0265392 | A1* | 10/2013 | Rhee | G06F 3/005 |
| | | | | 348/46 |
| 2014/0168262 | A1* | 6/2014 | Forutanpour | G06T 19/006 |
| | | | | 345/633 |
| 2015/0029222 | A1* | 1/2015 | Hofmann | G06K 9/00993 |
| | | | | 345/633 |
| 2015/0228123 | A1* | 8/2015 | Yasutake | G06T 19/006 |
| | | | | 345/633 |
| 2015/0287203 | A1* | 10/2015 | Baumberg | H04N 5/232 |
| | | | | 382/103 |
| 2016/0275722 | A1* | 9/2016 | Bretschneider | G06T 19/006 |
| 2017/0178272 | A1* | 6/2017 | Lashkari | G02B 27/017 |

* cited by examiner

| β = 0 | Below | Midline | Above |
|---|---|---|---|
| b) |  $\theta = |\beta|$ | Not Applicable | Not Applicable |

METHOD FOR DEVELOPING AUGMENTED REALITY EXPERIENCES IN LOW COMPUTER POWER SYSTEMS AND DEVICES

RELATED APPLICATION

This application claims the benefit of U.S. Provisional Application No. 62/559,697 filed Sep. 18, 2017, which is incorporated herein by reference in its entirety

BACKGROUND OF THE INVENTION

The claimed invention relates to augmented reality (AR). AR is a technology that superimposes a computer-generated sensory input, such as sound, video, graphics or GPS data, on a user's view of the real world, e.g., a mobile phone's camera view or through AR enabled glasses, thus providing a composite view in real-time.

Augmented reality requires computationally-intensive computer vision which does not work well in many environments, such as, lower-end mobile devices and on web browsers. This is due to irregular memory access and imbalanced workloads.

The existing Web based AR solutions require physical markers, significant processing power and/or are browser specific. That is, the existing AR solution is built for a specific browser, e.g., Chrome, and/or requires another background process or application. Alternatively, the existing AR application communicates with a background process or another application.

The claimed invention proceeds on the desirability of solving these problems and challenges. The claimed system and method is operable on devices with a low processing power and it is not web browser specific, such that the claimed invention is operable on any web browser.

OBJECTS AND SUMMARY OF THE INVENTION

The claimed invention provides a method for creating augmented reality experiences in low computing power systems, such as, lower-end mobile phones and via the web. It is capable of achieving both 3 degrees of freedom (3 DoF) and 6 degrees of freedom (6 DoF) views of the virtual object.

To achieve a realistic composite view, the AR technology must:
1) Understand how to position the virtual object in the user's real-world view (even as they move); and
2) Render the virtual object at the correct orientation and scale (e.g., appear larger as the user's camera "gets closer" to the virtual object or rotate as the user "moves around" the virtual object). In order to appear realistic, this virtual object must also adjust relative to the device view.

The ability to do this in real time is computationally expensive, making it difficult to execute on low computing capacity systems/devices. The claimed invention provides a realistic composite view using far less processing power than the conventional methods, and thereby enabling the claimed invention to be used both in the context of an "app" and/or as a web-only solution. That is, the claimed invention makes AR available on less expensive devices and allows the user to access AR solely via the web (vs. requiring the download of additional add-ons or native apps, as required with conventional systems).

In accordance exemplary embodiment of the claimed invention, a method and system for generating an augmented reality experience without a physical marker is provided. At least two frames from a video stream are collected and one of the frames is designated as a first frame. The graphical processor of a device prepares two collected frames for analysis and features from the two collected frames are selected for comparison. The central processor of the device isolates points on a same plane as a tracked point in the first frame and calculates a position of a virtual object in a second frame in 2D. The next frame from the video stream is collected and the process is repeated until until the user navigates away from the URL, webpage or when the camera is turned off. The central processor renders the virtual object on a display of the device.

In accordance with an exemplary embodiment of the claimed invention, a non-transitory storage medium comprising a program for generating an augmented reality experience without a physical marker is provided. The program when executed by a processor-based device to cause the device to collect at least two frames from a video stream. One of the frames is designated as a first frame. The graphical processor of a device prepares two collected frames for analysis and features from the two collected frames are selected for comparison. The central processor of the device isolates points on a same plane as a tracked point in the first frame and calculates a position of a virtual object in a second frame in 2D. The next frame from the video stream is collected and the process is repeated until the user navigates away from the URL, webpage or when the camera is turned off. The central processor renders the virtual object on a display of the device.

Various other objects, advantages and features of the present invention will become readily apparent from the ensuing detailed description, and the novel features will be particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description, given by way of example, and not intended to limit the present invention solely thereto, will best be understood in conjunction with the accompanying drawings in which.

DETAILED DESCRIPTION OF THE EMBODIMENTS

Figure 1A:
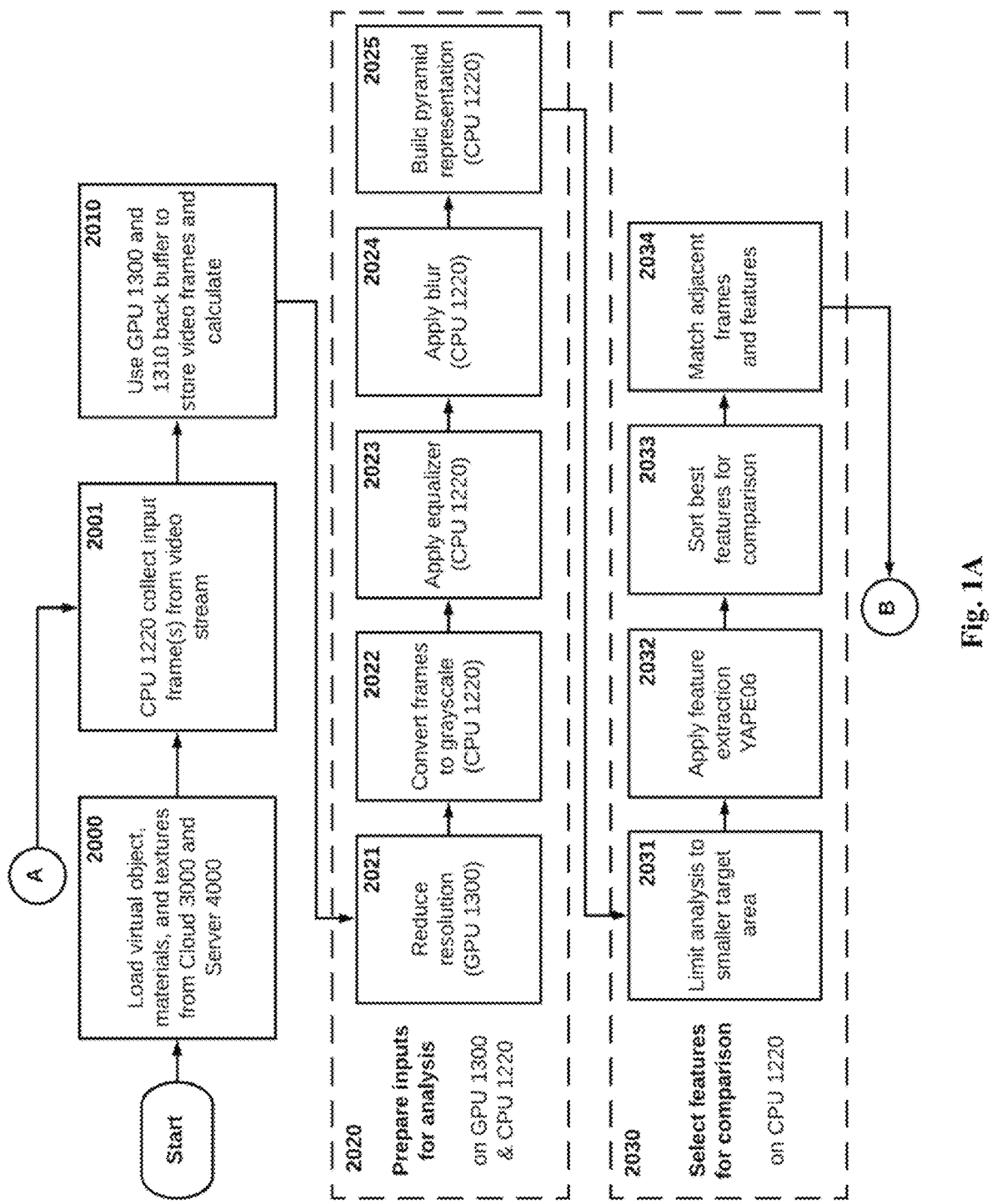
FIGS. 1A-B are flowcharts illustrating the overall process of developing 6 DoF and 3 DoF augmented reality experiences in low computing devices and systems in accordance with an exemplary embodiment of the claimed invention.

Achieving realistic AR requires the system to calculate and render the change in position of the virtual object, and define the necessary adjustments to scale and orientation as the device or user moves in real time.

A summary of the exemplary differences in methods between the conventional methodology and the claimed invention is set forth in Table 1. It is appreciated that three main elements must be determined and executed in order to realistically render the virtual object on the device display in real time: (1) position of the virtual object, (2) relative distance (and therefore scale) of the virtual object to the device/user and (3) relative orientation or angle to the device/user. In accordance with an exemplary embodiment, the claimed methods which do not require a physical marker, works in 3 and 6 DoF and/or require less computation, thereby dramatically lowering processing needs.

In systems with low processing power (e.g., current web-based AR solutions), physical markers are used to place virtual objects in the real world. Markers are a real-life item, used to mark the placement of the virtual object and to determine the correct scale of the virtual object relative to the user's view of the real world. With markers, the heavy calculations mentioned in Conventional Method B herein are avoided. However, markers require the user to print a preset design on a printer, or be in possession of a specific object (e.g., book or catalog where the software knows the real-life size of the marker). Requiring a marker, is a barrier to use. It adds steps to the process (the need to acquire or print a marker) and for certain applications, such as shopping or marketing, it is inconvenient and results in lower usage conversions. Also, markers are not accurately identifiable at longer distances. If the user places the marker several feet from their position, it may be hard to identify via object recognition and the marker will not work.

Conventional Method B—Essential or Fundamental Matrix Estimation (Used in High Computing Power Systems):

In high computing power systems, one must determine how to position the virtual object as the device moves based on matching points (minimum of 5 points) from two images/frames of video and calculating the change in 3D position of the camera. One way to achieve this is by taking the fundamental matrix and computing the essential matrix. The two matrices are related as follows: $E=K'*F*K$, where K is the intrinsic matrix of the camera. E is an essential matrix, e.g., 3×3 matrix, which relates corresponding points in stereo images assuming the cameras satisfy the pinhole camera model. K' is the transpose of K. K and K' are the

TABLE 1

Comparison of Conventional Methods v. the Claimed Invention

| | Conventional Methods | Claimed Invention |
|---|---|---|
| Virtual Object Positioning | A) Physical marker determines placing of virtual object OR<br>B) Calculating the relative camera positions between subsequent images/frames via the estimation of essential matrix (or the fundamental matrix) and sensor fusion of gyroscope and accelerometer inputs OR<br>C) Not applicable: 3 DoF always renders the same relative to the device regardless of the device's position in the real world | Calculation of the change in position between tracked points between subsequent images/frames using homography |
| Relative distance and therefore scale | A) Physical marker has known dimensions which allows the software to scale the object relative to the marker OR<br>B) Calculating the relative camera positions between subsequent images/frames via the estimation of essential matrix (or the fundamental matrix) and Device height inputted by user<br>C) Not applicable: Scale is not relative to the real world in most 3 DoF experiences | Sensor fusion of gyroscope and accelerometer inputs, and Device height inputted by user |
| Relative angle | A) Physical marker determines orientation of virtual object OR<br>B) Calculating the relative camera positions between subsequent images/frames via the estimation of essential matrix (or the fundamental matrix) and sensor fusion of gyroscope and accelerometer inputs<br>C) Not applicable: 3 DoF always renders the same relative to the device regardless of the device's position in the real world | Sensor fusion of gyroscope and accelerometer inputs |

Position of the Virtual Object:

Conventional Method A—Physical Markers (Used in Low and High Computing Power Systems):

intrinsic calibration matrices of the two images in question. F is a fundamental matrix and is the algebraic representation of epipolar geometry. Rotation ("R") and translation ("T") between the cameras are then determined from the essential matrix (E) using multiple calculations to isolate the correct values for R and T. Given there are two opposite directions which are possible and two different rotations which are compatible with the essential matrix, this results in four solutions for the rotation and translation between the two camera positions. In order to determine which of the four solutions is correct, the points are projected back into 3D. Three of the solutions produce a 3D point which lies behind one or more of the camera positions. There is only one solution that produces a 3D point in front of both cameras, in addition, after determining R and T, an estimation for the coefficient for T must be determined as well. Thus, calculating the change in 3D position of the camera is a complicated multi-step calculation which requires a large amount of computing power (especially when these calculations are run in real-time at a high frames per second frequency).
Conventional Method C—Limiting Degrees of Freedom (Used Mainly in Low Computing Power Systems):

Another conventional method employed in the low processing power systems limits the AR experience to 3 degrees of freedom (3 DoF). Degrees of freedom (DoF) refers to the movement of a rigid body within space. There are only 6 degrees of freedom in total, comprised of two types: translations (forward/back, up/down, left/right) and Euler angles (pitch, yaw, and roll). Some AR experiences are limited to 3 DoF, resulting in a composite view that is not realistic because the user can only stand in one position (and tilt the device) to view the virtual object. With 3 DoF, if the user moves around the virtual object, the object does not adjust appropriately.

For example, at the start, the front of a virtual dining chair faces a real-world dining table (i.e., the front of the chair is tucked under the dining table while the back of the chair faces the user) and the user moves to look at the scene from the side. In a 3 DoF viewer, the chair will not rotate relative to the user's change in angle, the back of the chair will remain facing the user and the front of the virtual chair will now face sideways relative to the real-world dining table.

By limiting the degrees of freedom, the computationally expensive calculations can be avoided, thereby requiring lower processing power. However, the result is a limited and less realistic AR experience.
The Claimed Invention:

Instead of using a physical marker, calculating the 3D movement of the camera, or always limiting to 3 DoF, the claimed invention calculates the change in position of a set of tracked points (preferably, a minimum of 4 points) between adjacent frames of video. The claimed method allows for a much simpler calculation, thereby requiring less processing power. In accordance with an exemplary embodiment of the claim invention, ideal features in the frames are selected by removing outliers. The ideal features in the frames are differentiable features in the images, e.g., dark dots on a white wall, where the corresponding points can be identified between the two images. Points on the same plane as the tracked points are identified. By isolating the points in the same plane as the tracked points, 2D homography (a simpler calculation) can be performed in the claimed invention. The homographic transformation of these points in the two frames of video is then calculated, resulting in much lower processing needs.

The claimed method, although much simpler vs. conventional solutions employed in the high computing power environments, can result in higher instance of errors. Whereas the essential matrix method (Conventional Method B) is able to calculate the small changes in height of the device (as the user moves around the room), the claimed invention does not necessarily account for small changes in device height. Thus, if the homographic transformation is projected back into 3D to place the object, these height errors can become magnified, causing the virtual object to appear like it is "jiggling" in the user's view. To resolve this potential problem, the claimed invention calculates the movement of the tracked points between the two image/frames in 2D, moving the virtual object on the screen without taking depth into account. Therefore, changes in device height are no longer an issue in the claimed invention. In fact, the error rate is lowered and the "jiggle" is eliminated. The perception of 3D is then generated by adjusting the object's scale and rotation (as discussed herein).

To further lower processing requirements, the claimed invention limits analysis to a smaller target area, thereby reducing unnecessary calculations.
Scale and Orientation of Virtual Object:
Conventional Method A:

For marker-based AR, the scale of the virtual object is calculated using the known dimensions of the physical marker as a reference. Virtual object orientation is also determined relative to the orientation of the physical marker. As mentioned herein, AR which is dependent on physical markers have inherent disadvantages.
Conventional Method B:

Without a physical marker, the relative depth between the device and position of the virtual object must be derived in order to properly scale the object. In systems with high processing capabilities, both depth and orientation are outputs of the essential matrix calculations used to determine the change in camera angle between two images/frames. Again, as described herein, these calculations are computationally expensive.
Conventional Method C:

Orientation does not adjust in 3 DoF implementations of AR. The virtual object is rendered relative to the device vs. relative to the real world. This is a key disadvantage to 3 DoF.
The Claimed Invention The claimed invention calculates the change in depth and orientation between each set of images/frames by using inputs from the sensors 1100, preferably, gyroscope and accelerometer, on the device 1000. Turning to FIGS. 5A-C and 6A-C, the claimed method uses fixed positions (the position of the virtual object relative to the vertical and horizontal midlines of the display 1200 and device 1000 orientation), versus moving positions (e.g., as used in Conventional Method B) to derive necessary angle and distance inputs. Once again, the calculations of the claimed invention are much simpler vs. conventional methods (e.g., Conventional Method B) which calculate of the change in position of the camera, while eliminating the disadvantages of Conventional Method A and Conventional Method C. As a result of this advancement, the claimed invention can be implemented on the web browser versus just "apps" as typical in the conventional systems/methods and on devices with less processing capabilities in both 3 and 6 DoF and without a physical marker.

Figure 1B:
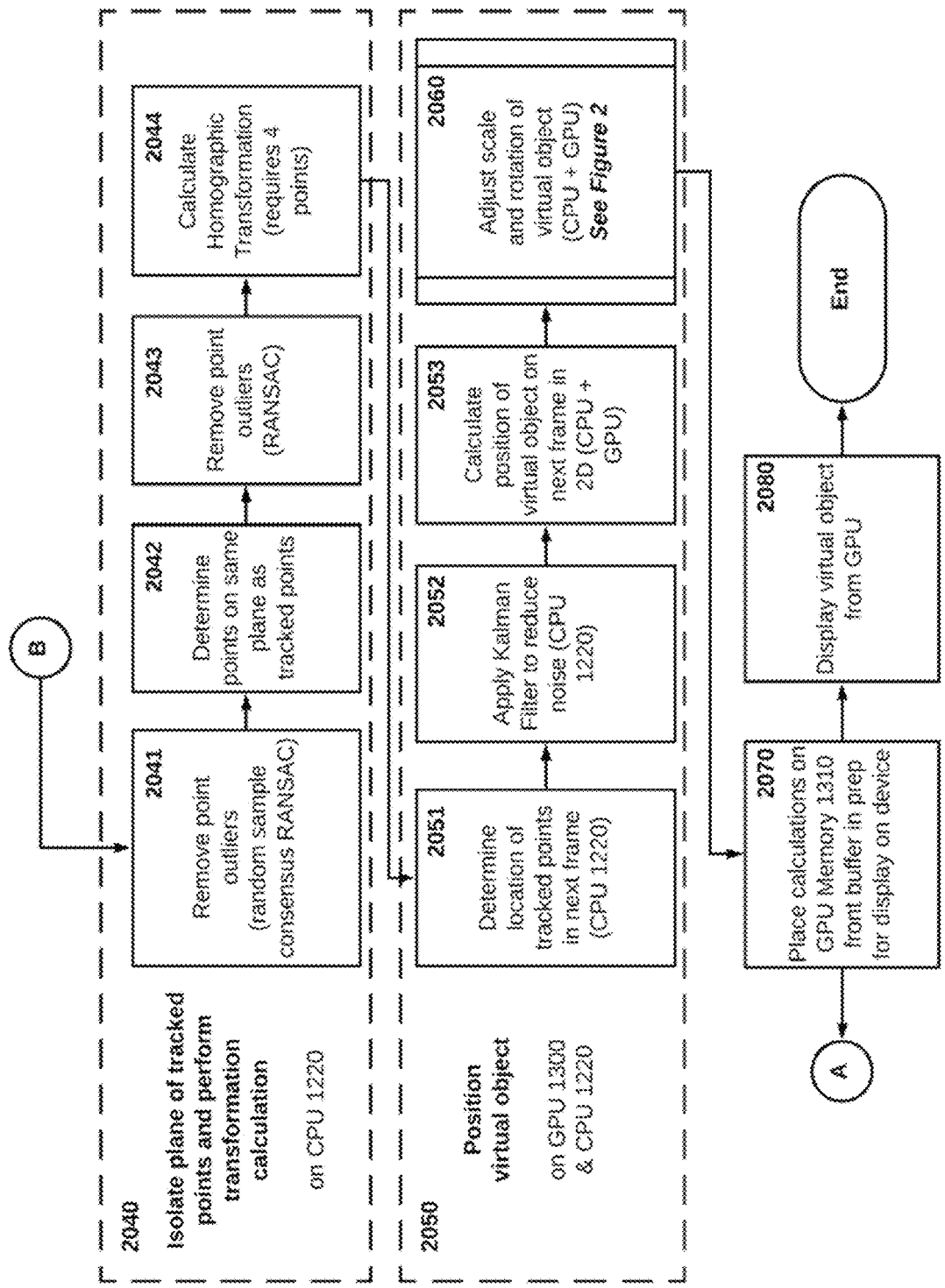

In FIGS. 1A-B and 2, in accordance with an exemplary embodiment of the claimed invention, there are illustrated flowcharts for developing 6 DoF and 3 DoF augmented reality experiences in low computing devices and systems without the need for a physical marker as required in the conventional system. In step 2000, the virtual object and materials are loaded from the cloud storage 3000 onto the web browser 1400, and textures are loaded onto the graphical processing unit (GPU) 1300 from the server 4000. In step 2001, the central processing unit (CPU) 1220 collects at least 2 images/frames from a video stream, e.g., frames 1 and 2. It is appreciated that the video stream may be captured in real-time using a camera 1110 or previously captured and stored in memory 1210. In step 2010, the CPU 1220 communicates with the GPU 1300 to buffer the collected frames in the GPU's memory 1310 and to delay what the user sees while the position of the virtual object is calculated in subsequent steps. It is appreciated that buffering of collected frames is required to address the latency of writing and fetching data associated with the web browsers.

The GPU 1300 prepares inputs for analysis in step 2020. The preparation step 2020 comprises the steps 2021-2025. The resolution of the collected frames is reduced by down-sampling in step 2021. Down-sampling reduces the amount of data to be processed. There is an inverse relationship between accuracy and down-sampling. In accordance with an exemplary embodiment, the claimed invention determines and operates at an optimal point where maximum benefit is obtained, i.e., reduction of overall execution time while the overall accuracy stays constant or within a range. That is, a point where no additional benefit is obtained by increasing the down-sampling.

Then, the CPU 1220, via the device memory 1210 and the data bus 1510, converts the frames to grayscale in step 2022, applies equalizer in step 2023, applies blur in step 2024, and prepares a pyramid representation in step 2025. The CPU 1220 applies equalizer to normalized the illumination channel of the image. If there is a bright spot in the image, it will negatively impact the feature extraction. It helps the CPU 1220 extract and use features from the relative dark or shadowed spots in the image.

In step 2030, the CPU 1220, via the device memory 1210 and the data bus 1510, selects features in both inputs, e.g., Frames 1 and 2, for comparison. The feature selection step 2030 comprises the steps 2031-2034. The analysis is limited to smaller target area in step 2031, feature extraction, preferably, YAPE060, is applied in step 2032, best features are sorted for comparison in step 2033, and features are matched on adjacent frames, preferably using the Lucas-Kanade Method, in step 2034. It is appreciated that by reducing the area of the screen (i.e., device display) that is processed (e.g., by ⅓), based on the calculated homographic transformation, the processing needs per cycle is also reduced. This enables the claimed system to focus on the area of interest, thereby reducing the required processing per cycle.

Figure 12:
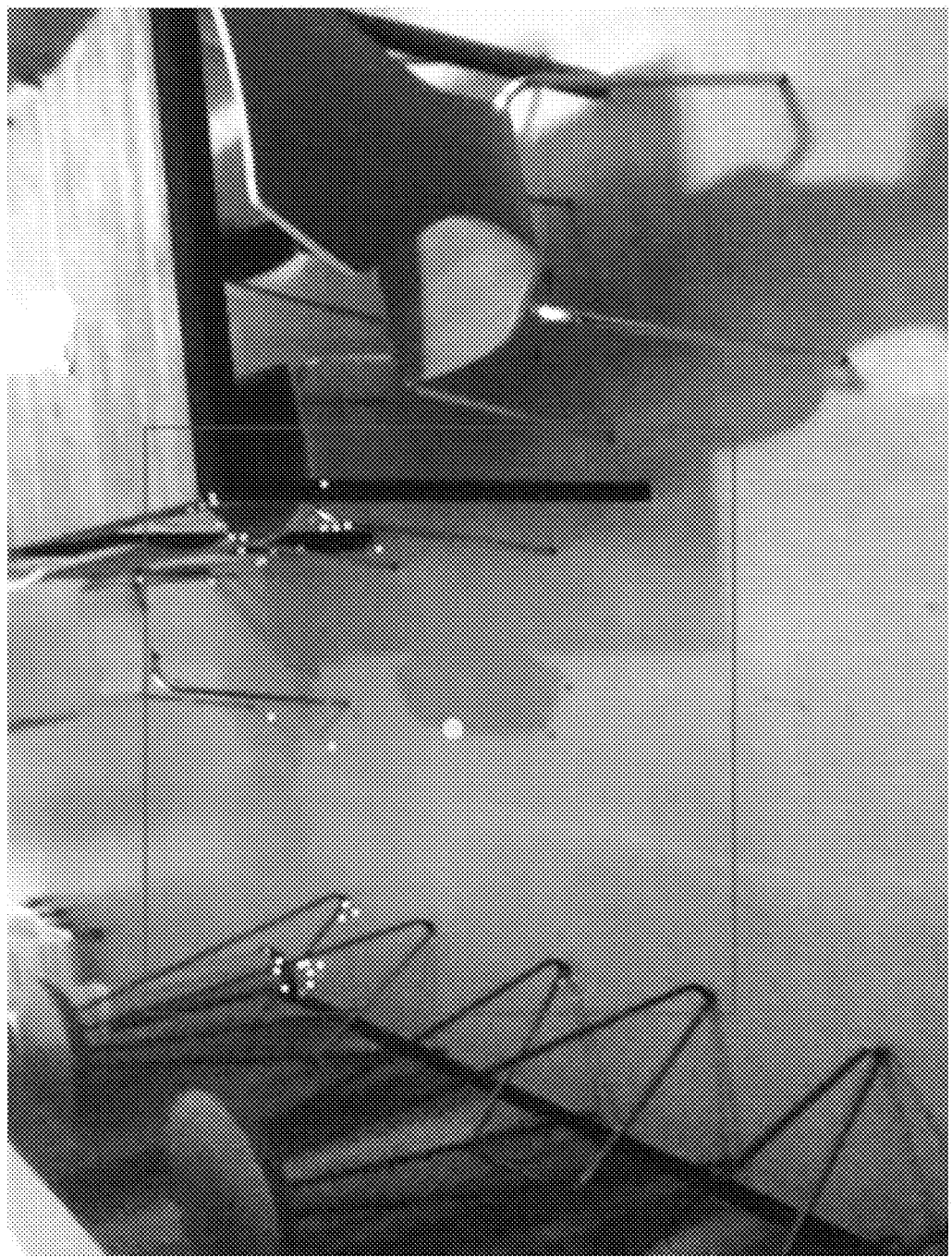
FIG. 12 is an exemplary photo utilized in describing the process of removing additional outlier points in accordance with an exemplary embodiment of the claimed invention.

In step 2040, the CPU 1220, via the device memory 1210 and the data bus 1510, isolates points on the same plane as target points in Frame 1. The isolating points step 2040 comprises the steps of removing outlier data, preferably, using random sample consensus (RANSAC), in step 2041, identifying points on the same plane as targets in step 2042, removing outlier data again, preferably using random sample consensus (RANSAC), in step 2043, and calculating homographic transformation using at least four points in step 2044. As exemplary shown in FIG. 12, the CPU 1220 removes blue dot or circle on the leg of the chair as an outlier in step 2043, as shown in FIG. 12. It is appreciated that other transformation techniques and models can be utilized in the claimed invention.

Figure 11:
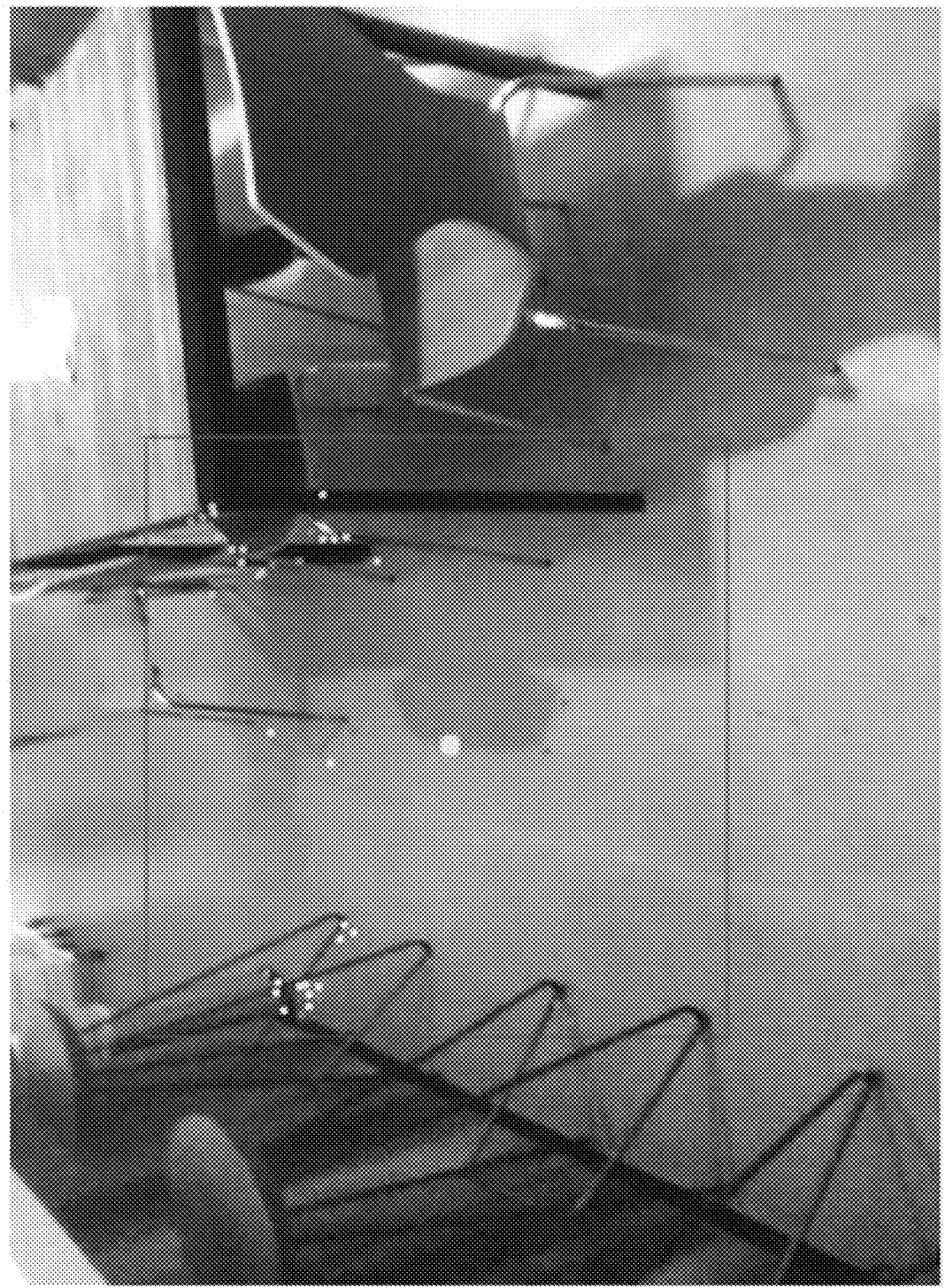
FIG. 11 is an exemplary photo utilized in describing the process of identifying points on the same plane as the target point in accordance with an exemplary embodiment of the claimed invention.

For example, turning now to FIG. 11, the CPU 1220 determines how a tracked point or area, i.e., a large yellow circle in the center of the red rectangle in FIG. 11, has moved in the current frame relative to the previous frame. The red rectangle in FIG. 11 represents the small target area defined in step 2031. The CPU 1220 calculates the motion model of the points (blue points in FIG. 11) in the same plane as the target point (i.e., the large yellow circle in FIG. 11) and apply that to the previous position of tracked point and the result is the new coordinate for the tracked point.

As explained above, the CPU 1220 finds corresponding points (i.e., the blue points in FIG. 11) in two consecutive frames in step 2042. The goal of the claimed invention is to select points that are on the same plane as our tracked point, i.e., the large yellow circle in FIG. 11). In order to do so, the CPU 1220 performs triangulation, preferably Delaunay triangulation, but it is appreciated that other methods can be employed by the claimed invention to achieve the same result. The CPU 1220 triangulates all the points and determines a triangle which surrounds the tracked point, i.e., the large yellow circle in FIG. 11. The CPU 1220 selects this triangle and its immediate neighbors and their vertices are used in next steps. In another words, the CPU 1220 finds a plurality of triangles wherein none of the points is inside the triangles but the tracked point is in the center of the triangles.

In accordance with an exemplary embodiment of the claimed invention, the CPU 1220, via the device memory 1210 and the data bus 1510, and in collaboration with the GPU 1300 calculates the position of the virtual object on the next frame in step 2050 to provide 6 DoF augmented reality experiences at scale. That is, step 2050 is not required to achieve a high quality 3 DoF augmented reality experiences. The position calculation step 2050 further comprises the steps 2051-2053 and 2060. In step 2051, the CPU 1220 determines the location of tracked points in the next frame (e.g., Frame 2) using the calculated homographic transformation in step 2044. The CPU 1220 applies the Kalman Filter to reduce noise in step 2052. Both the CPU 1220 and GPU 1300 are utilized to calculate the position of the virtual object in the virtual representation of the world (i.e., the next frame or Frame 2) in step 2053. In accordance with an exemplary embodiment of the claimed invention, the positioning calculation step 2053 are performed in 2D and the claimed system and method creates an illusion that 3D object is placed in a real 3D environment by adjusting scale in step 2060. In essence, the claimed invention eliminates the intense 3D computations required in the conventional methods, but without any discernable difference to the user.

Figure 2A:
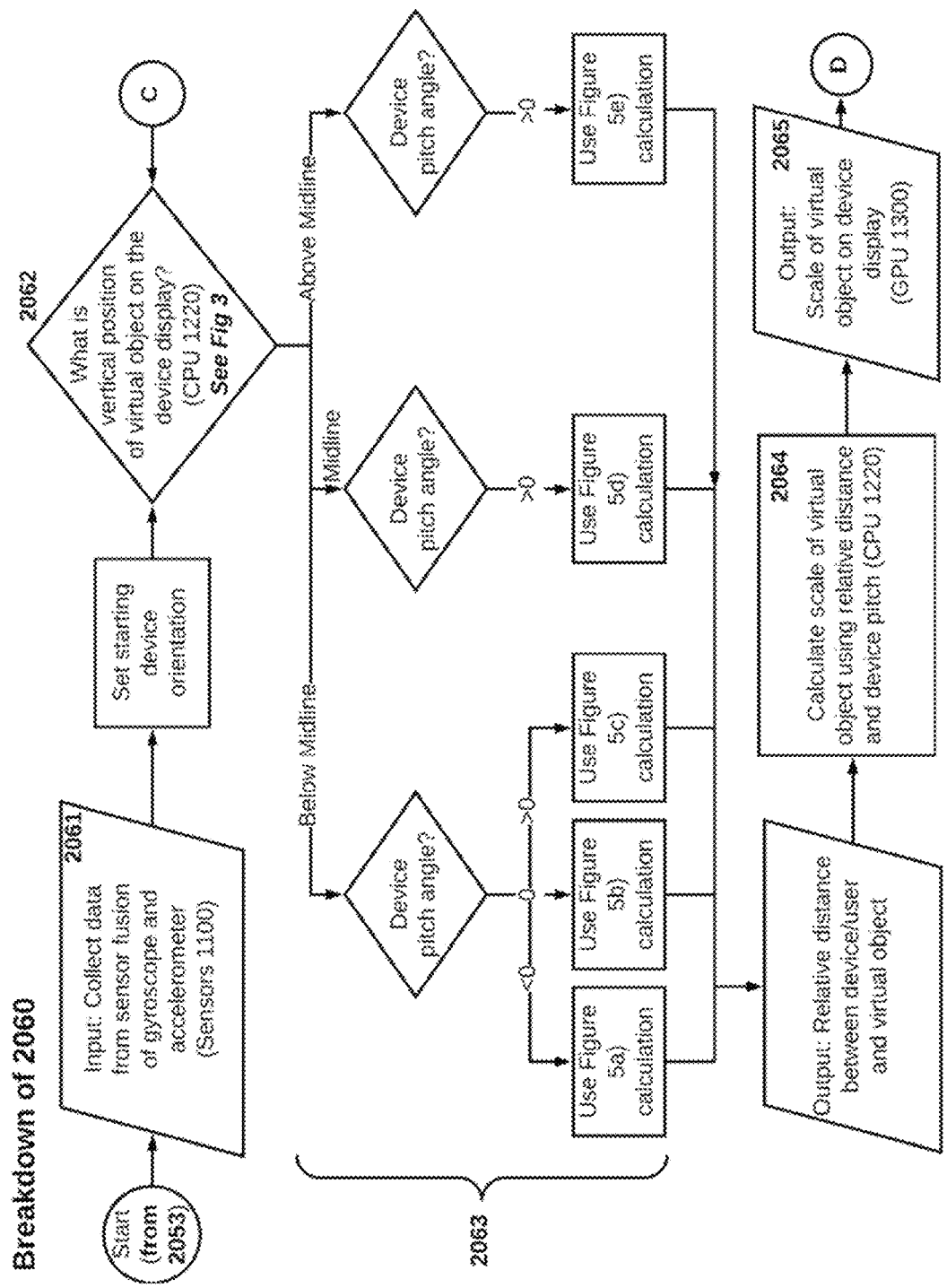
FIG. 2A-2B are flowcharts illustrating the process for determining relative distance/scale and relative angle of virtual object in accordance with an exemplary embodiment of the claimed invention.
Figure 2B:
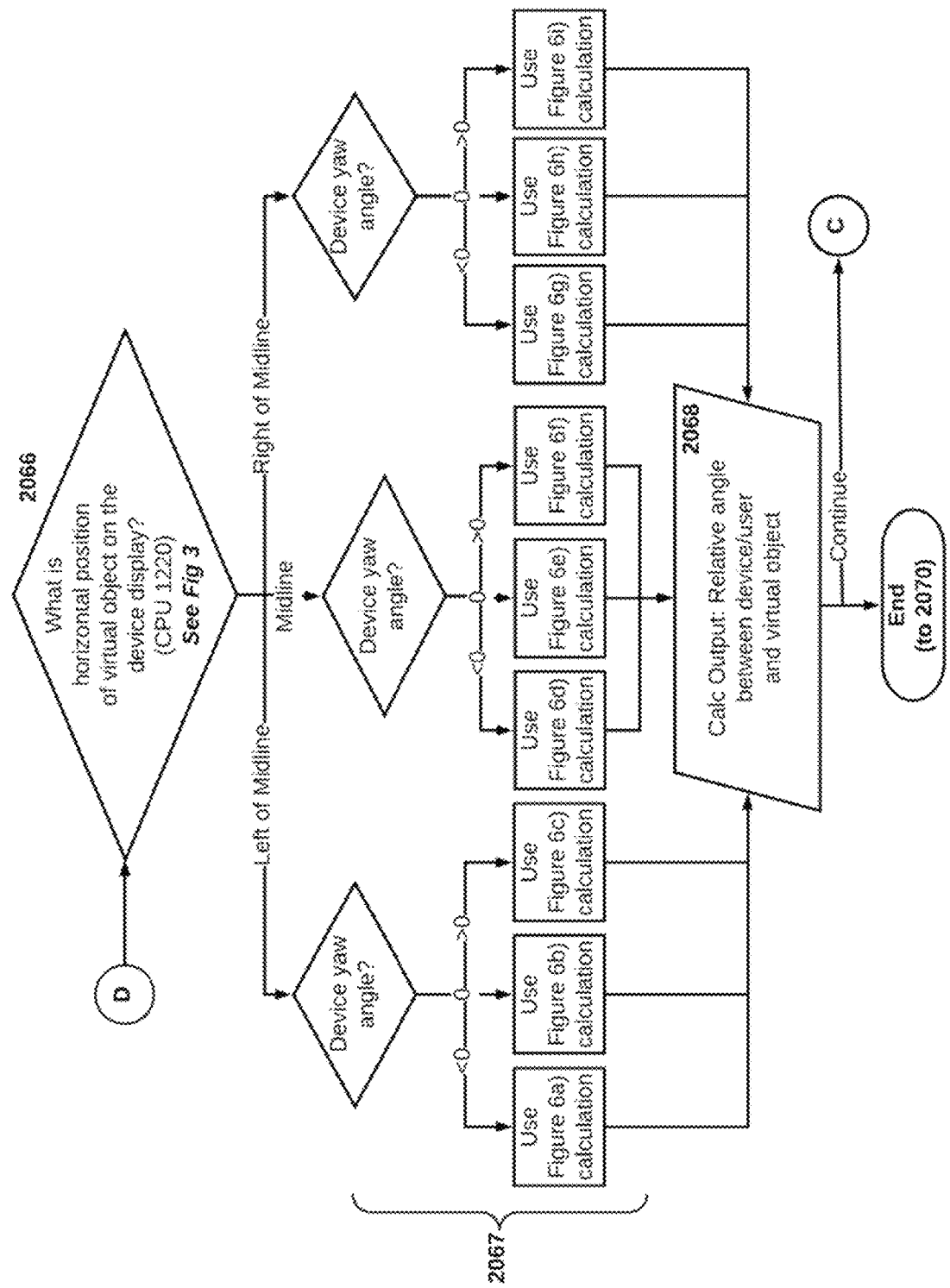
Figure 3:
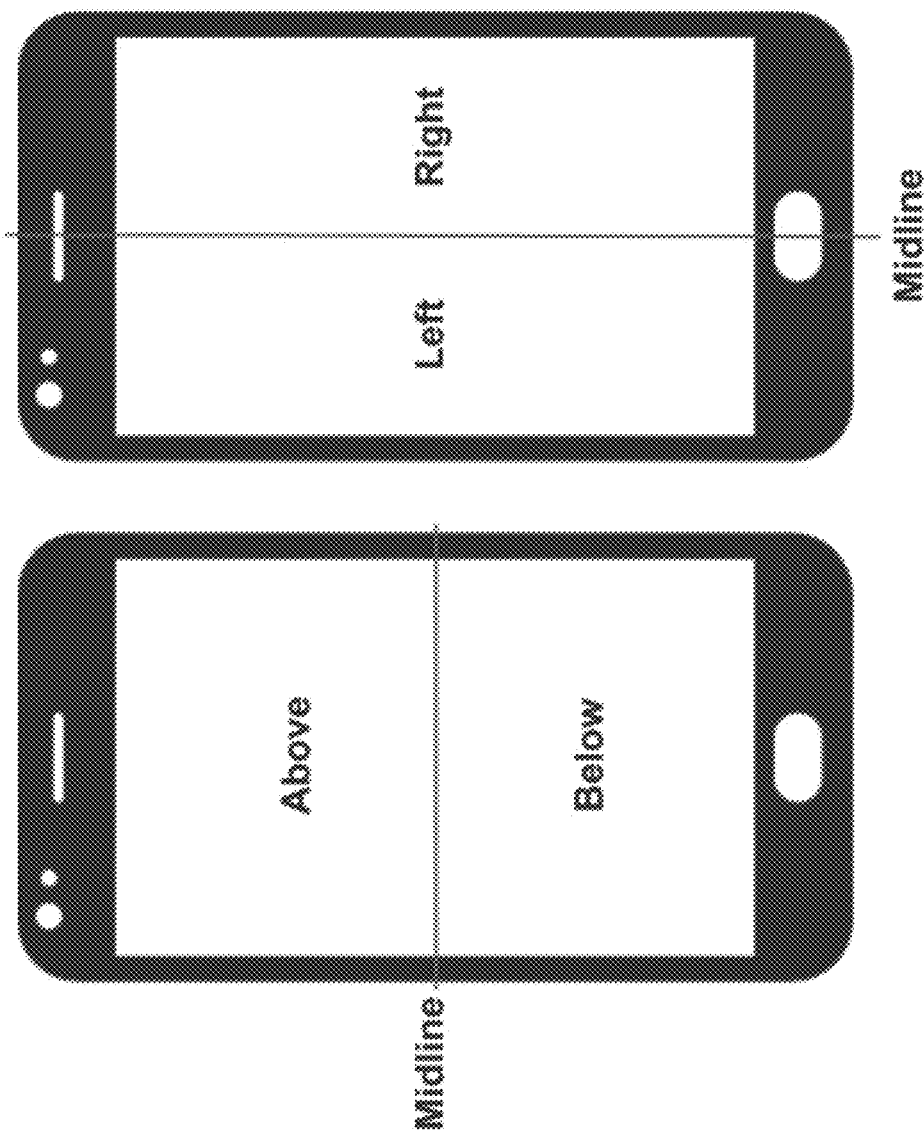
FIG. 3 is an illustration of a virtual object position on a display.
Figure 4:
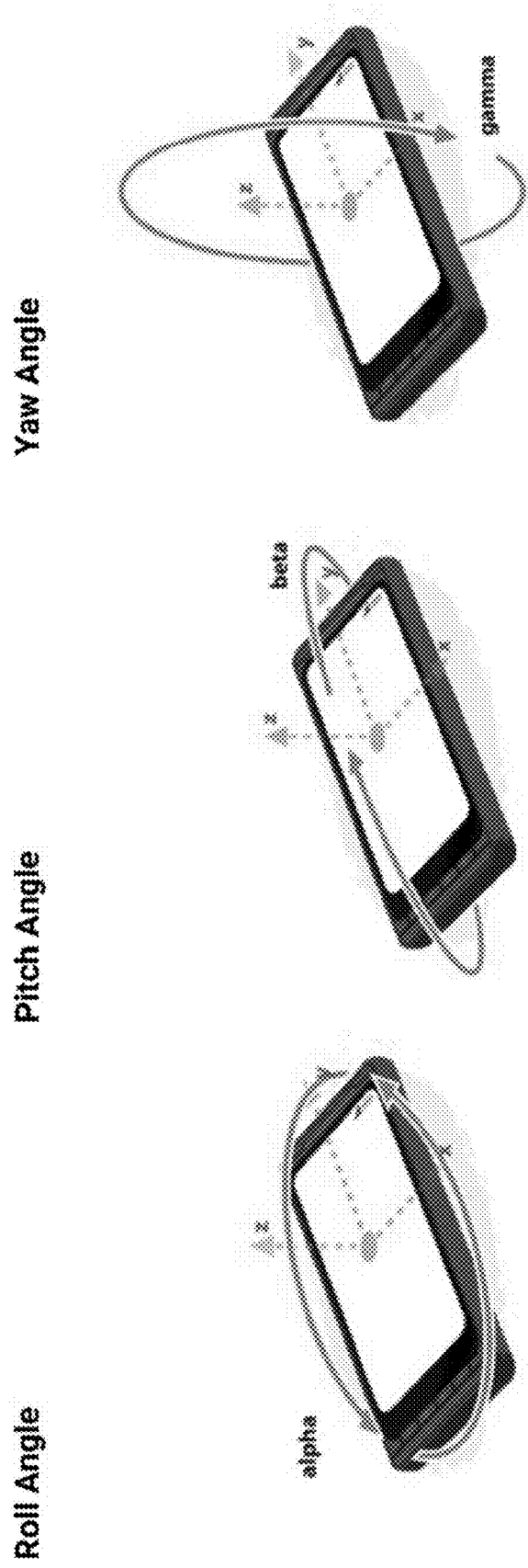
FIG. 4 is an illustration of device orientation.
Figure 5A:
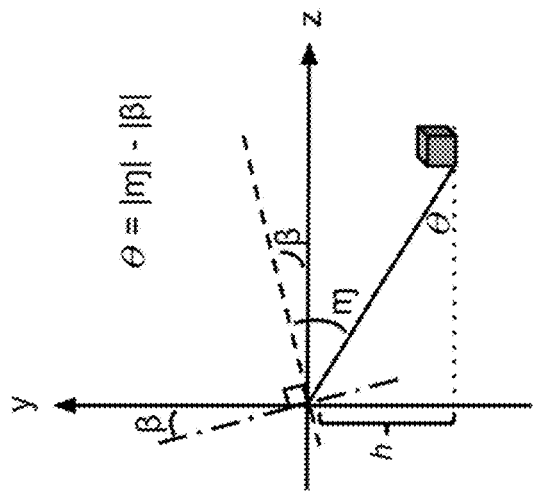
FIGS. 5A-C are graphical representations for determining theta and relative distance in accordance with an exemplary embodiment of the claimed invention.
Figure 5B:
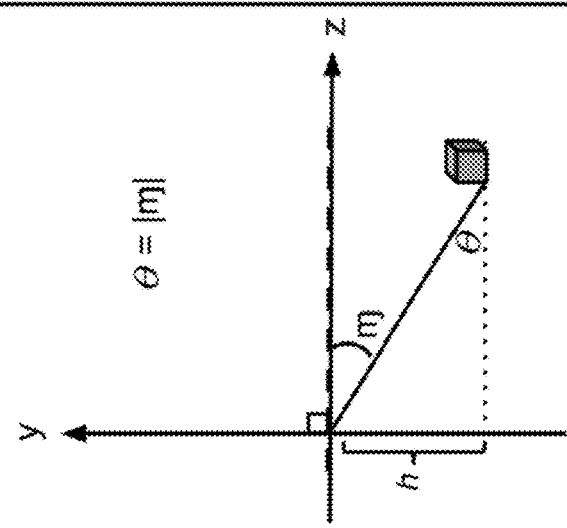
Figure 5C:
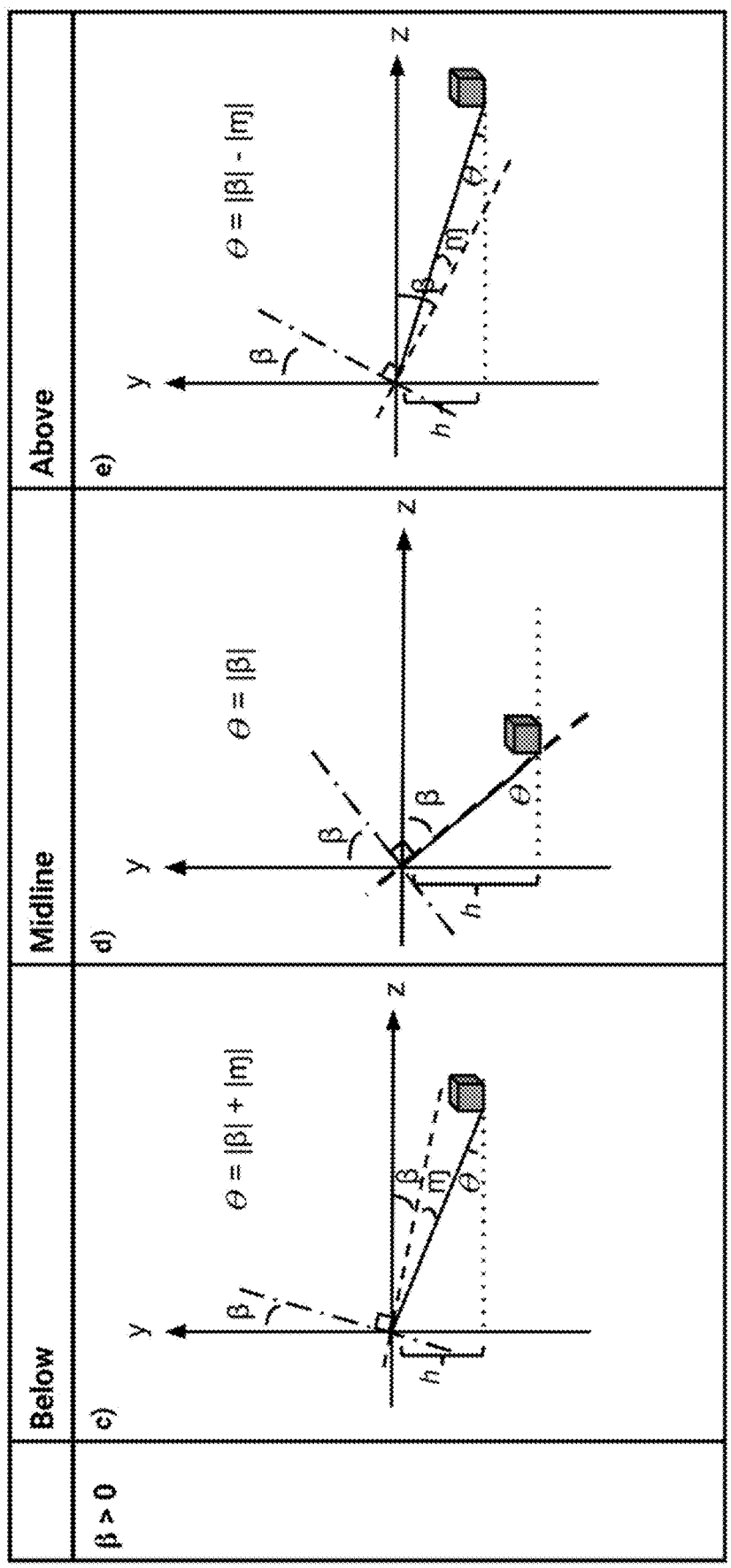

In accordance with an exemplary embodiment of the claimed invention, there is illustrated a flowchart detailing the process of adjusting the scale and orientation of the virtual object by the GPU 1300 and the CPU 1220 in FIGS. 2A-2B. The adjusting step 2060 comprises the steps 2061-2068. Turning now to FIG. 2A, in step 2061, a starting orientation using the data from the device sensor 1100 is set. In step 2062, the CPU 1220 determines the vertical position of the virtual object on the device's display 1200 relative to the display midline, as shown in FIG. 3. In step 2063, the CPU 1220 obtains a pitch angle of the device, as shown in FIG. 4. In step 2064, the CPU 1220 calculates the relative distance based on the outputs from steps 2061-2063, as shown in FIGS. 5A-C. In step 2065, using the calculated relative distance and user inputted device height, the GPU 1300 calculates appropriate virtual object scale. It is appreciated that the users may move the virtual object vertically around the device's display 1200 by dragging the virtual object with a mouse or using the touchscreen 1200.

Figure 6A:
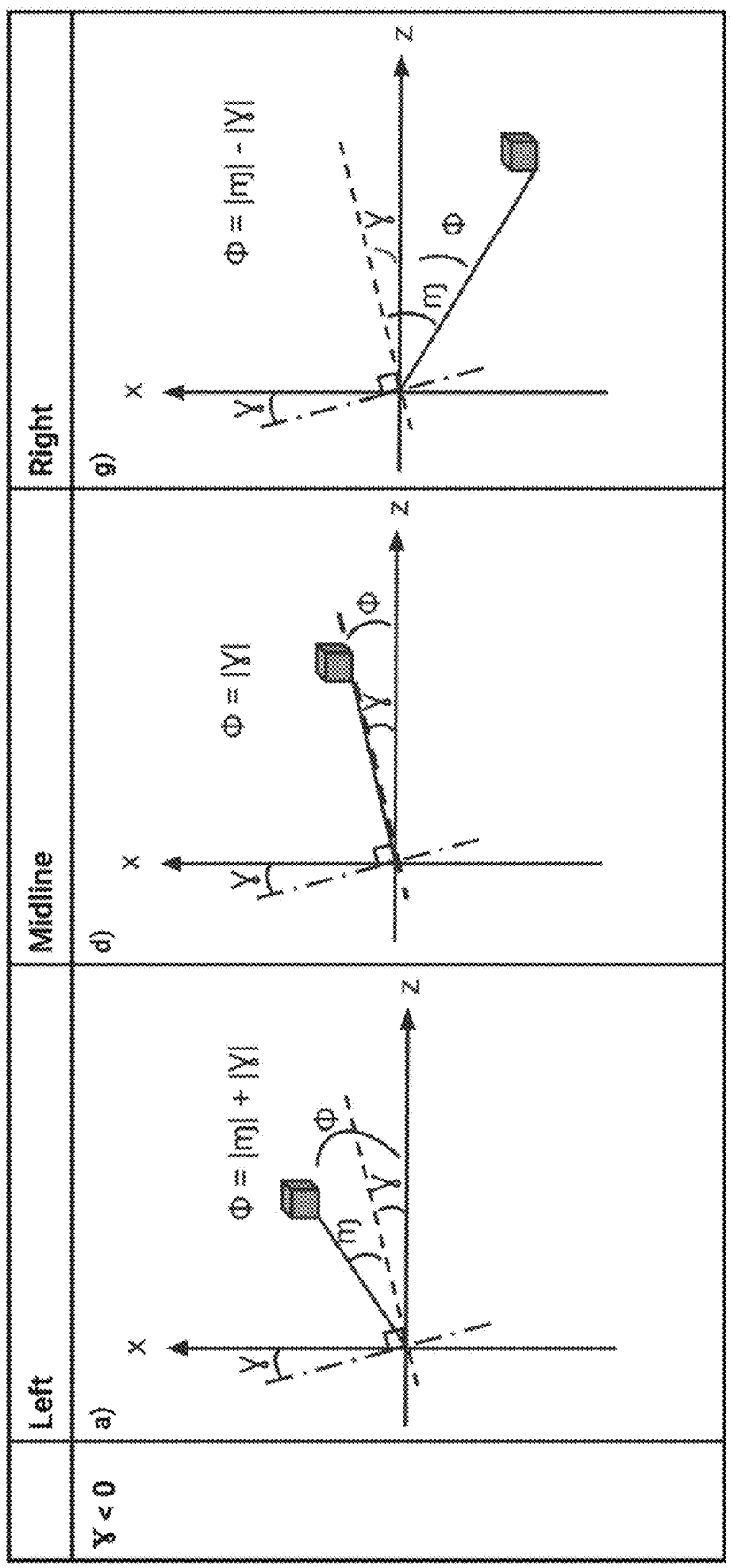
FIGS. 6A-C are graphical representations for determining relative angle in accordance with an exemplary embodiment of the claimed invention.
Figure 6B:
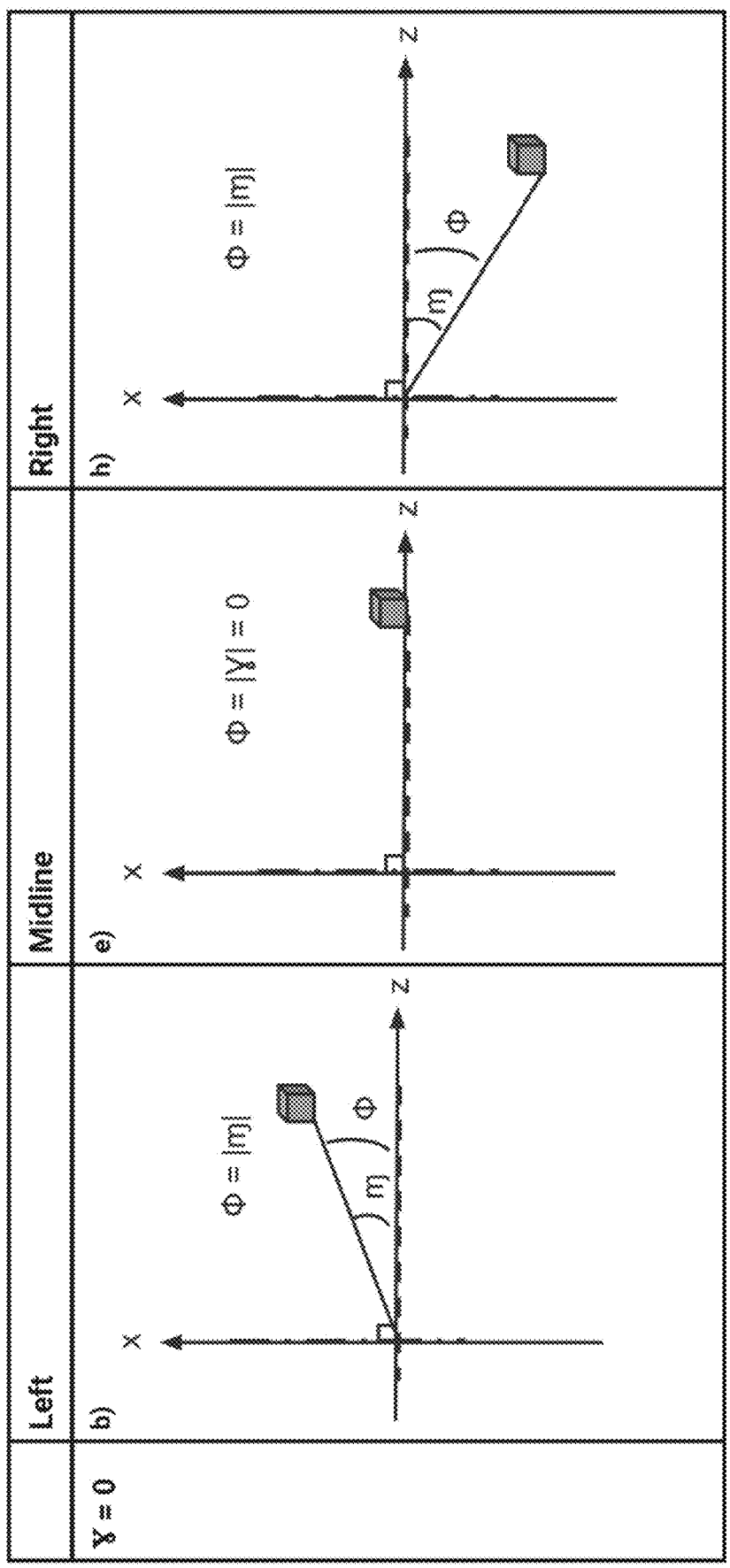
Figure 6C:
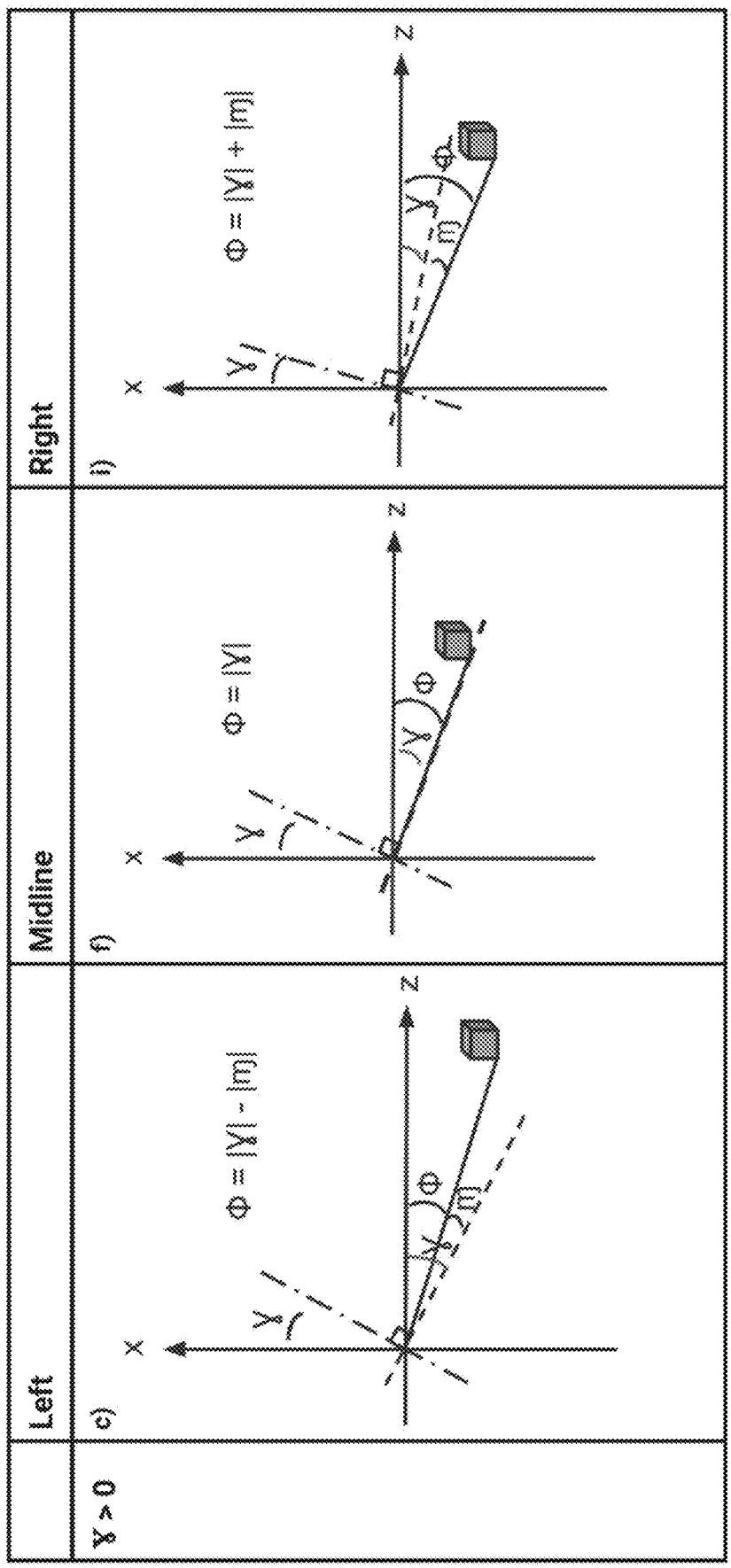
Figure 7:
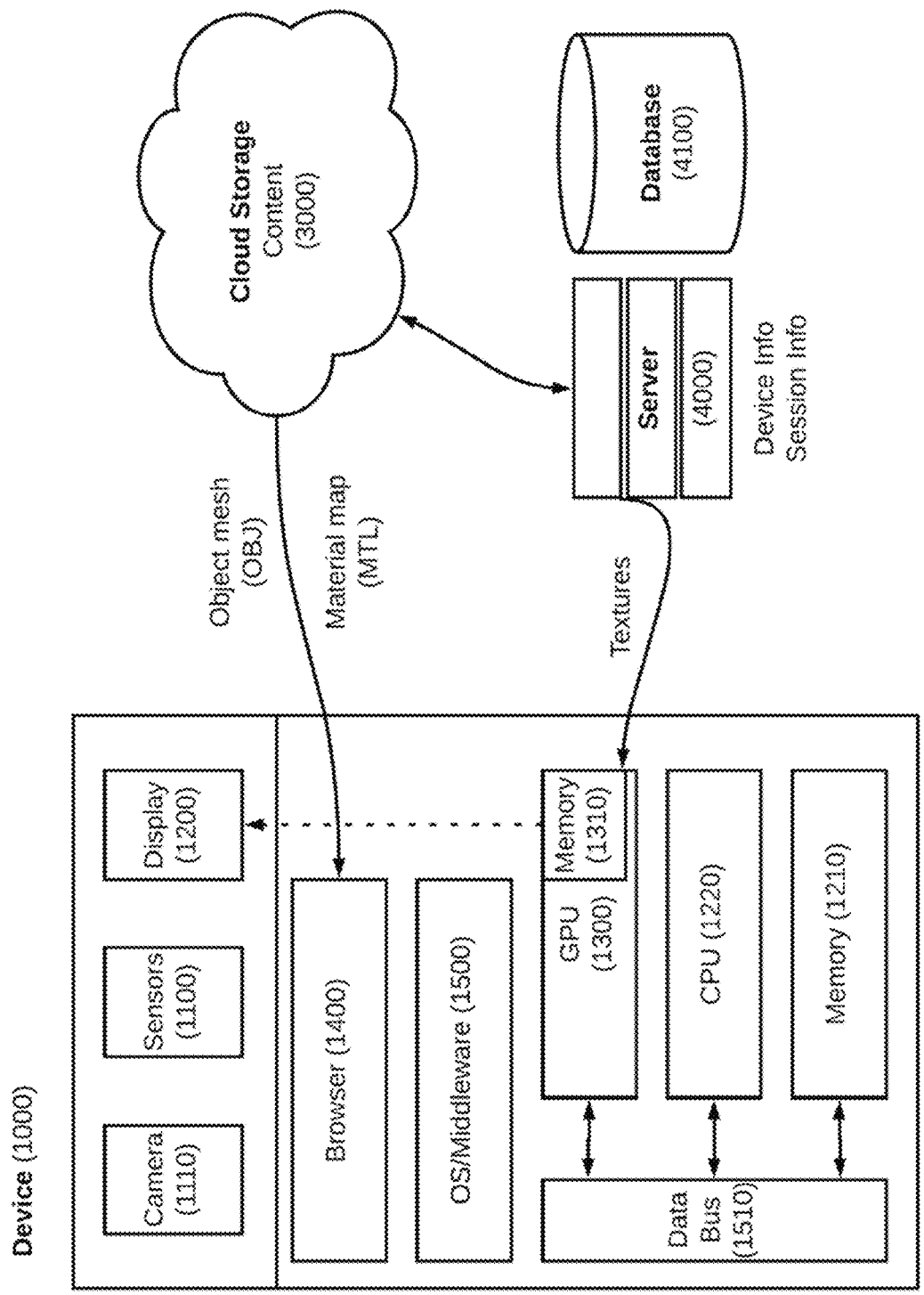
FIG. 7 is a block diagram of the system for developing augmented reality experiences in low computing power systems and devices in accordance with an exemplary embodiment of the claimed invention.

In accordance with an exemplary embodiment of the claimed invention, to provide 6 DoF augmented reality experiences with digital objects at scale, the CPU 1220 additionally performs steps 2066-2068 as shown in FIG. 2B. The CPU 1220 determines the horizontal position of the virtual object on the device's display 1200 relative to the display midline in step 2066, as shown in FIG. 3; obtains the yaw angle of the device 1200 in step 2067, as shown in FIG. 4; and calculates the relative angle based on the calculated outputs of steps 2064-2067, as shown in FIGS. 6A-C, in step 2068. That is, steps 2066-2068 are not required to provide a high quality 3 DoF augmented reality experiences.

The GPU 1300 places the calculated coordinates and data on the front buffer, i.e., the GPU's memory 1310, in preparation for display on device 1000 in step 2070. The GPU 1300 renders the virtual object on the display 1200 continuously based on determined and/or calculated Position, Relative Distance/Scale, and Relative Angle in step 2080, and the CPU 1220 returns to step 2001 to collect the next image/frame (e.g., Frame 3) and repeat steps 2010-2070 by comparing the collected frame (e.g., Frame 3) to previous frame (e.g., Frame 2).

This process is repeated until the "app" is closed or the user navigates away from the webpage or the URL, or when the camera is turned off by the user in step 2090, thereby effectively ending the rendering of the virtual object. Alternatively, the process ends when all the requisite images/frames have been collected or a predetermined number of images/frames have been collected.

The claimed invention advantageously lowers the processing power and computational requirements necessary to create an augmented reality experience in real-time. Augmented reality requires computationally-intensive computer vision which does not work well in many environments, such as, lower-end mobile devices and on web browsers. This is due to irregular memory access and imbalanced workloads. By lowering the computational and processing power required to achieve a realistic, real-time overlay of a virtual object (an AR experience), the claimed invention enables AR to be achieved across more environments (e.g., on more devices and via a web browser versus a native application).

Figure 8:
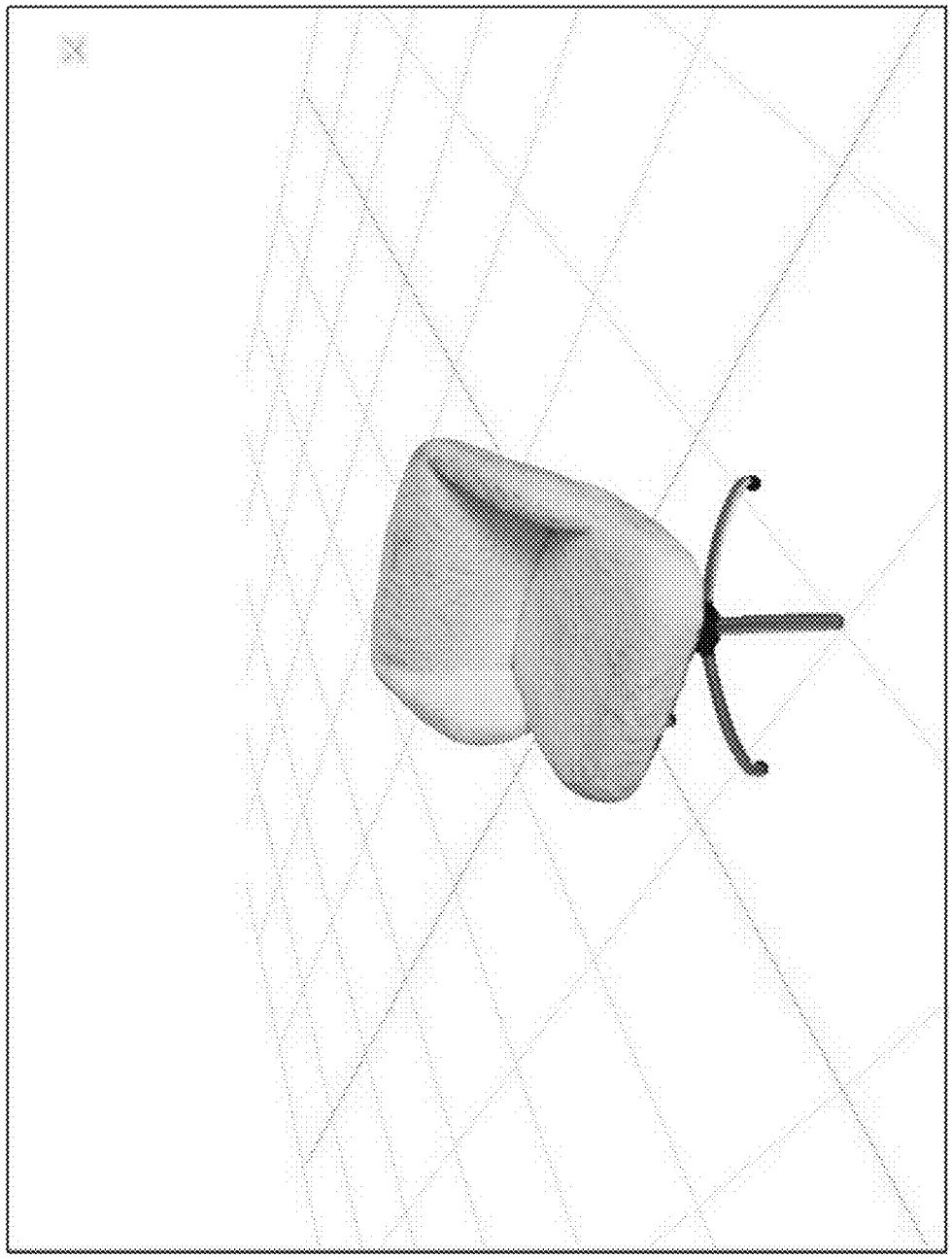
FIGS. 8-10 are photos of a chair in different coordinates to illustrate the tracking of the camera position in accordance with an exemplary embodiment of the claimed invention.
Figure 9:
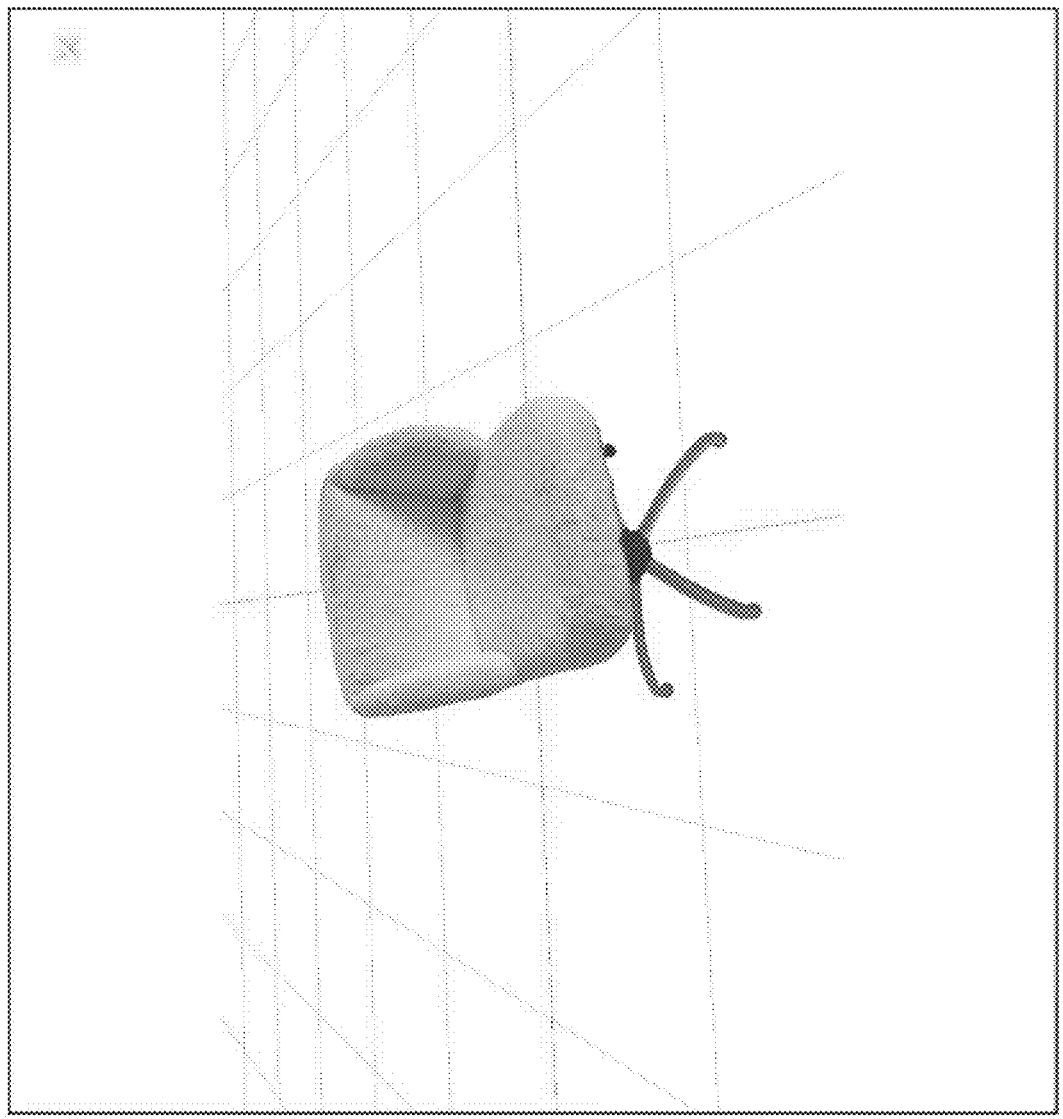
Figure 10:
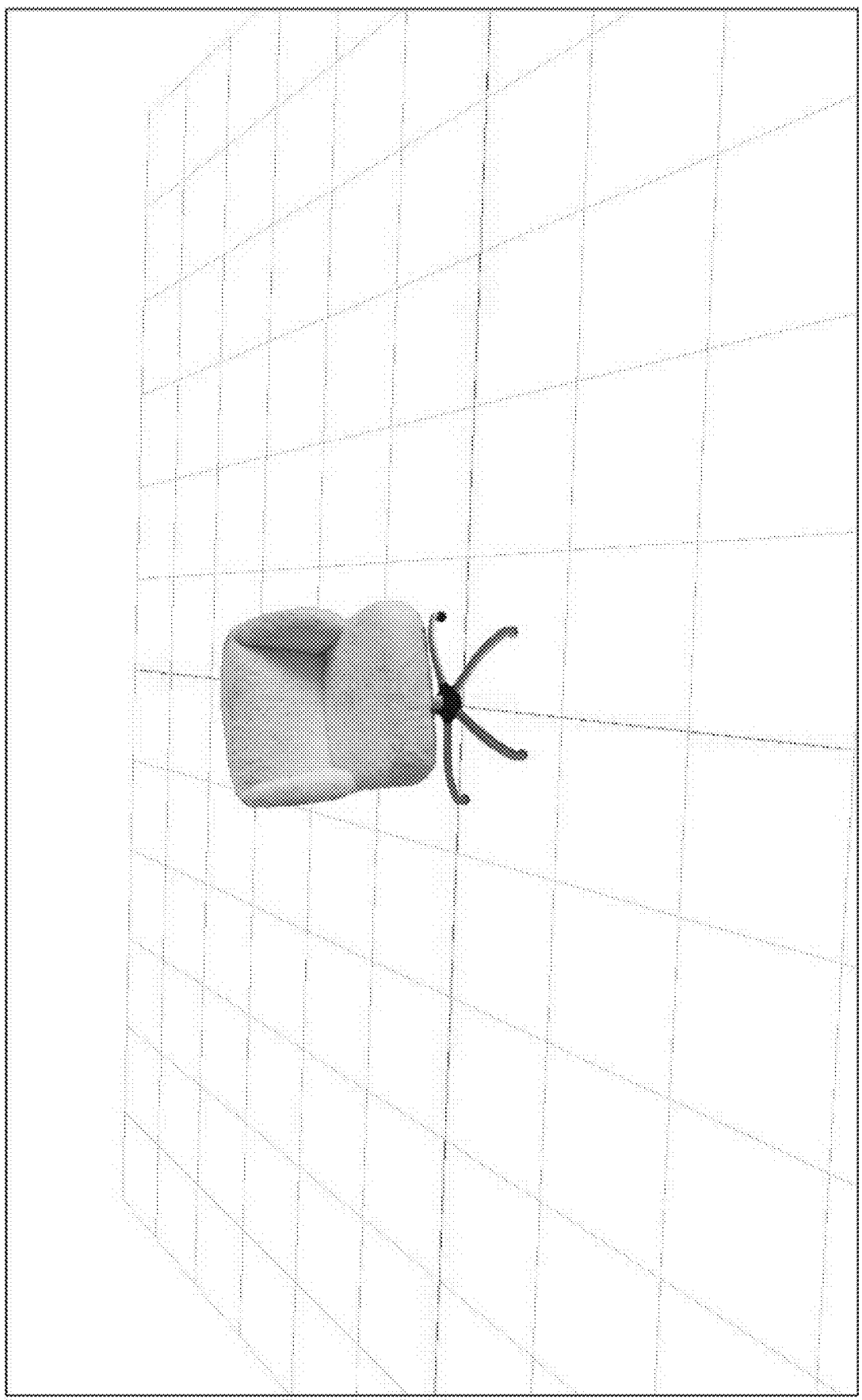

In relation to the two industry benchmarks that test device performance: Basemark OS II and AnTuTu (performance is directly related to the score, higher the score, higher the performance). The claimed invention works on all devices, including low-end mobile devices, but conventional 6 DoF methods only work on high powered devices, such as Samsung Galaxy S7 and Apple iPhone 7 plus. That is, the claimed invention can provide both 3 DoF and 6 DoF augmented reality experiences on all devices, regardless of their power performance. In other, the claimed invention is not limited to high powered devices.

view, x, y, z coordinate and direction in which the camera is looking at. In FIGS. 8-10, there are shown images of the same chair at different coordinates, the red lines represent x and z, and the height in which the camera is held represents y.

In the image of the chair shown in FIG. 8, x=3, z=3 and y=1.6 meters. In FIG. 9, the camera 1110 is moved, such that z=3, x=0 and height (y) stays the same. In next image of the chair shown in FIG. 10, the camera 1110 is moved back to increase the z to 4 meters and increase the height (y) to 2.4 meters.

In accordance with an exemplary embodiment of the claimed invention, the GPU 1300 replaces the white background of the images with a camera feed and the CPU 1220 tracks the camera (phone) 1110 movements in a reasonable timeframe in order to achieve an acceptable user experience. For example, all of the processing should be performed in 100 ms=1 sec/10 frames so as to create an experience that the claimed system is placing a virtual object in the real environment for the user.

To achieve this user experience, the system needs to find or determine the corresponding points in consecutive (image) frames. The system then calculates the essential matrix using 6-points, 8-points and the like. The essential matrix is then decomposed using eigen decomposition or Singular Value Decomposition or similar algorithms to obtain the rotation and translation of the camera between two frames. As explained herein, this process involving complicated calculations is not feasible on web (running on browser) or in apps on phones with a low processing power.

In accordance with an exemplary embodiment, to overcome these problems when operating in the web or on low processing devices, the claimed invention processes and operates in 2D. The claimed invention calculates where the object should be on user display by tracking the 2D coordinate in which the virtual object is placed at. If the claimed invention knows where the object should be on the screen, how tall (how far or close) is it and how the object should be rotated then the claimed invention can create the illusion that there is a 3D object placed in real environment.

Operating System and Browser Agnostic AR Experience:

In accordance with an exemplary invention, the claimed system and method provides an operating system and web browser agnostic AR experience by lowering the number of processes and complexity of algorithms. The claimed invention enables 6 DoF and 3 Dof AR to be viewed on the web. Thus, the claimed invention can be advantageously used on

| Benchmark | Samsung Galaxy S5 | Lenovo Phab 2 Pro | Apple iPhone 6s | Samsung Galaxy S7 | Apple iPhone 7 plus |
|---|---|---|---|---|---|
| Basemark OS II | 1,054 | 1,628 | 2,139 | 2,411 | 3,119 |
| AnTuTu | 36,603 | 84,676 | 59,075 | 139,915 | 179,811 |

In accordance with an exemplary embodiment of the claimed invention, the claimed system and method tracks in 2D, preferably using a triangulation method of finding points on the same plane as the target, and then changes the angle and scale to make it look and feel like 3D. Whereas, the conventional methods track how the camera is moving. In other words, the claimed invention performs all processing and calculation in 2D as opposed to 3D as in conventional methods.

The claimed invention is now explained herein using a non-limiting example. Camera or phone camera has field of all mobile devices, regardless of operating system (e.g., iOS, Android, Windows Phone, etc.) and browser type (e.g., Safari, Chrome, etc.).

This is important for many businesses. In the case of a game developer, they are able to create one version of their game versus multiple versions across iOS, Android, etc. This lowers their development and operating costs considerably.

In the case of a furniture retailer, e.g., selling a dining room chair, they are able manage one version of their AR application as well (vs. both iOS and Android versions). In addition, the furniture retailer is able to link to the AR experience directly from their website. Customers do not need to download an "app" in addition to their mobile browser.

For advertisers and marketers, they are able to launch AR campaigns and commercials directly from emails, social media posts, etc. without the need for users to download an "app." Again, conversions and engagement increase due to this streamlined user journey.

The claimed invention benefits the end user as well. Conventional methods require the user to download a native app, which is a relatively high barrier to usage. At least 3+ steps are required to navigate to the app store, download an app, open it, and deploy it. Thus, users cannot casually test or try the app. For certain applications, the need to download an app greatly reduces conversion. Also, users would have to download multiple apps in order to shop across companies or view AR ads across advertisers and/or ad platforms. For example, if the consumer wants to purchase a chair, they would need to download apps from each furniture store to view the chair. Consumers are also leery of downloading many apps to their devices due to the threat of computer viruses, etc. Most consumers only download apps from the largest and most popular brands.

Ease of Integration

Since the claimed invention runs on the web without the need to download an "app" by the end user, this advantageously allows for a simpler integration user's existing technology, e.g., game developers' or furniture retailers' existing technology. For example, the claimed invention can be added to a furniture retailer's website with less than 10 lines of javascript (versus requiring the development and integration with a retailer's app, which is much more complex).

In accordance with an exemplary embodiment of the claimed invention, a non-transitory storage medium comprising a program for generating an augmented reality experience without a physical marker is provided. The storage medium may be a cloud-based storage, flash drive, DVD, CD or any tangible storage medium for storing computing programs. The program when executed by a processor-based device to cause the device to collect at least two frames from a video stream. One of the frames is designated as a first frame. The graphical processor of a device prepares two collected frames for analysis and features from the two collected frames are selected for comparison. The central processor of the device isolates points on a same plane as a tracked point in the first frame and calculates a position of a virtual object in a second frame in 2D. The next frame from the video stream is collected and the process is repeated until the user navigates away from the URL, webpage or when the camera is turned off. The central processor renders the virtual object on a display of the device.

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiment discussed above, those various alternatives which have been described and all equivalents thereto.

The invention claimed is:

1. A method for generating an augmented reality experience without a physical marker, comprising the steps of:
   a) collecting at least two frames from a video stream and designating one of the frames as a first frame;
   b) preparing said at least two collected frames for analysis by a graphical processor of a device
   c) selecting features from said at least two collected frames for comparison;
   d) isolating points on a same plane as a tracked point in the first frame by a central processor of the device;
   e) calculating a position of a virtual object in a second frame of the said at least two collected frames in 2D by the central processor;
   f) collecting a next frame from the video stream, designating the second frame as the first frame and designating the next frame as the second frame;
   g) rendering the virtual object on a display of the device to provide the augmented reality experiences on a web browser by the graphical processor; and
   h) repeating the steps b)-g) continuously until terminated by a user; and
   wherein the step of isolating points on the same plane as the track point in the first frame by the central processor comprises steps of removing outlier data using random sample consensus, removing outlier data again using random sample consensus, and calculating homographic transformation using at least four points.

2. The method of claim 1, further comprising step of buffering the collected frames in memory of the graphical processor to delay what the user sees on the display while the position of the virtual object is calculated.

3. The method of claim 1, wherein the step of preparing the collected frames comprises steps of reducing a resolution of the collected frames by down-sampling, converting the collected frames to grayscale, applying an equalizer and blur to the collected frames, and generates a pyramid representation of the collected frames.

4. The method of claim 1, wherein the step of selecting features comprises steps of limiting an analysis to a smaller target area less than at least 30% of an original target area, extracting features, sorting best features for comparison, and matching features on adjacent frames, thereby reducing an area of the display that is processed and reducing a required processing per cycle.

5. The method of claim 1, wherein the step of isolating points on the same plane as the track point in the first frame by the central processor further comprises a step of identifying points on the same plane as the track point to provide the augmented reality experiences with 6 degrees of freedom views.

6. The method of claim 5, wherein the step of calculating a position of a virtual object in the second frame in 2D comprises steps of determining a location of the tracked point in the second frame using the calculated homographic transformation, applying a Kalman filter to reduce noise, and calculating the position of the virtual object in a virtual representation of the second frame; wherein the positioning calculation are performed in 2D to create an illusion that 3D object is placed in a real 3D environment by adjusting a scale.

7. The method of claim 1, wherein the step of calculating a position of a virtual object in the second frame in 2D comprises steps of determining a location of the tracked point in the second frame using the calculated homographic transformation, applying a Kalman filter to reduce noise, and calculating the position of the virtual object in a virtual representation of the second frame; wherein the positioning calculation are performed in 2D to create an illusion that 3D object is placed in a real 3D environment by adjusting a scale.

8. The method of claim 7, wherein the step of calculating the position of the virtual object in the second frame in 2D comprises steps of adjusting scale and orientation of the virtual object.

9. The method of claim 8, wherein the step of adjusting scale and orientation comprises steps of setting a starting orientation using data from a sensor of the device; determining a vertical position of the virtual object on the display relative to a midline of the display; obtaining a pitch angle of the device; calculating a relative distance based on outputs from the steps of setting, determining the vertical position and obtaining the pitch angle; and calculating a virtual object scale from the calculated relative distance and a height of the device inputted by a user.

10. The method of claim 6, wherein the step of calculating the position of the virtual object in the second frame in 2D comprises steps of adjusting scale and orientation of the virtual object.

11. The method of claim 10, wherein the step of adjusting scale and orientation comprises steps of setting a starting orientation using data from a sensor of the device; determining a vertical position of the virtual object on the display relative to a midline of the display; obtaining a pitch angle of the device; calculating a relative distance based on outputs from the steps of setting, determining the vertical position and obtaining the pitch angle; and calculating a virtual object scale from the calculated relative distance and device height inputted by a user.

12. The method of claim 11, wherein the step of adjusting scale and orientation, to provide the augmented reality experiences with 6 degrees of freedom views, further comprises steps of determining a horizontal position of the virtual object on the display relative to the midline of the display; obtaining a yaw angle of the device; and calculating a relative angle based on the calculated outputs of steps of calculating the relative distance, calculating the virtual object scale, determining the horizontal position and obtaining the yaw angle.

13. The method of claim 6, wherein the step of rendering the virtual object renders the virtual object on the display based on the calculated position, relative distance and relative angle.

14. The method of claim 6, wherein the virtual object is renderable on the display of the device to provide the augmented reality experiences with 6 degrees of freedom views.

15. The method of claim 6, wherein the virtual object is renderable on the display of the device to provide the augmented reality experiences with 3 or 6 degrees of freedom views.

16. A non-transitory storage medium comprising a program for generating an augmented reality experience without a physical marker when executed by a processor-based device to cause the device to:
a) collect at least two frames from a video stream and designate one of the frames as a first frame;
b) prepare said at least two collected frames for analysis by a graphical processor of the device
c) select features from said at least two collected frames for comparison;
d) isolate points on a same plane as a tracked point in the first frame by a central processor of the device to provide the augmented reality experiences with 6 degrees of freedom views by removing outlier data using random sample consensus, identifying points on the same plane as the track point, removing outlier data again using random sample consensus, and calculating homographic transformation using at least four points;
e) calculate a position of a virtual object in a second frame of the said at least two collected frames in 2D by the central processor;
f) collect a next frame from the video stream, designate the second frame as the first frame and designate the next frame as the second frame;
g) render the virtual object on a display of the device to provide the augmented reality experiences on a web browser by the graphical processor;
h) repeat b)-g) continuously until terminated by a user.

17. The storage medium of claim 16, the program when executed causes the device to provide the augmented reality experiences with 6 degrees of freedom views.

18. The storage medium of claim 16, the program when executed causes the device to provide the augmented reality experiences with 3 or 6 degrees of freedom views.

19. A method for generating an augmented reality experience without a physical marker, comprising the steps of:
a) collecting at least two frames from a video stream and designating one of the frames as a first frame;
b) preparing said at least two collected frames for analysis by a graphical processor of a device
c) selecting features from said at least two collected frames for comparison;
d) isolating points on a same plane as a tracked point in the first frame by a central processor of the device;
e) calculating a position of a virtual object in a second frame of the said at least two collected frames in 2D by the central processor;
f) collecting a next frame from the video stream, designating the second frame as the first frame and designating the next frame as the second frame;
g) rendering the virtual object on a display of the device to provide the augmented reality experiences on a web browser by the graphical processor; and
h) repeating the steps b)-g) continuously until terminated by a user; and
wherein the step of preparing the collected frames comprises steps of reducing a resolution of the collected frames by down-sampling, converting the collected frames to grayscale, applying an equalizer and blur to the collected frames, and generates a pyramid representation of the collected frames.

20. A method for generating an augmented reality experience without a physical marker, comprising the steps of:
a) collecting at least two frames from a video stream and designating one of the frames as a first frame;
b) preparing said at least two collected frames for analysis by a graphical processor of a device
c) selecting features from said at least two collected frames for comparison;
d) isolating points on a same plane as a tracked point in the first frame by a central processor of the device;
e) calculating a position of a virtual object in a second frame of the said at least two collected frames in 2D by the central processor;
f) collecting a next frame from the video stream, designating the second frame as the first frame and designating the next frame as the second frame;
g) rendering the virtual object on a display of the device to provide the augmented reality experiences on a web browser by the graphical processor; and
h) repeating the steps b)-g) continuously until terminated by a user; and wherein the step of selecting features comprises steps of limiting an analysis to a smaller target area less than at least 30% of an original target area, extracting features, sorting best features for comparison, and matching features on adjacent frames, thereby reducing an area of the display that is processed and reducing a required processing per cycle.

* * * * *